Patented Jan. 9, 1923.

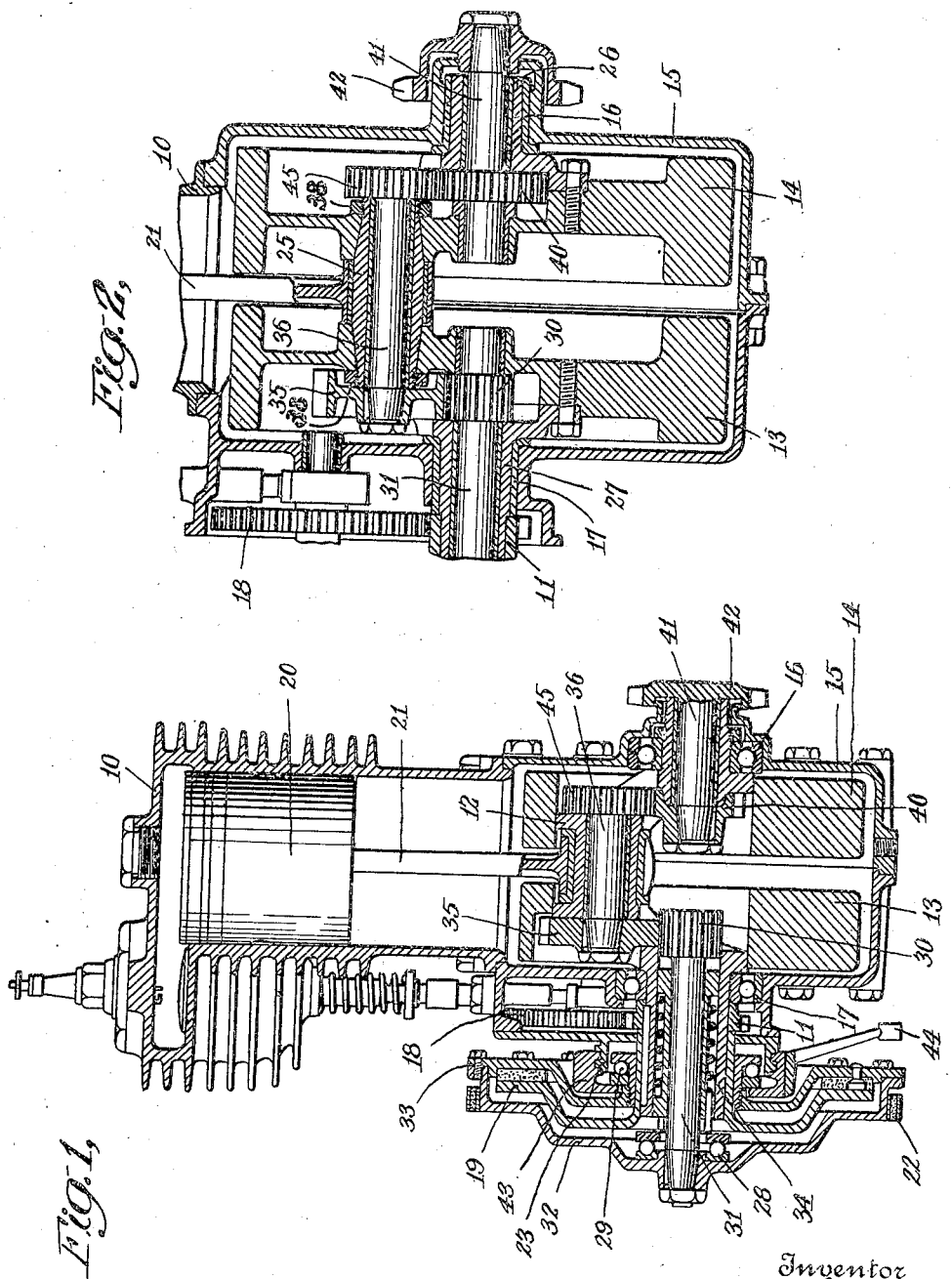

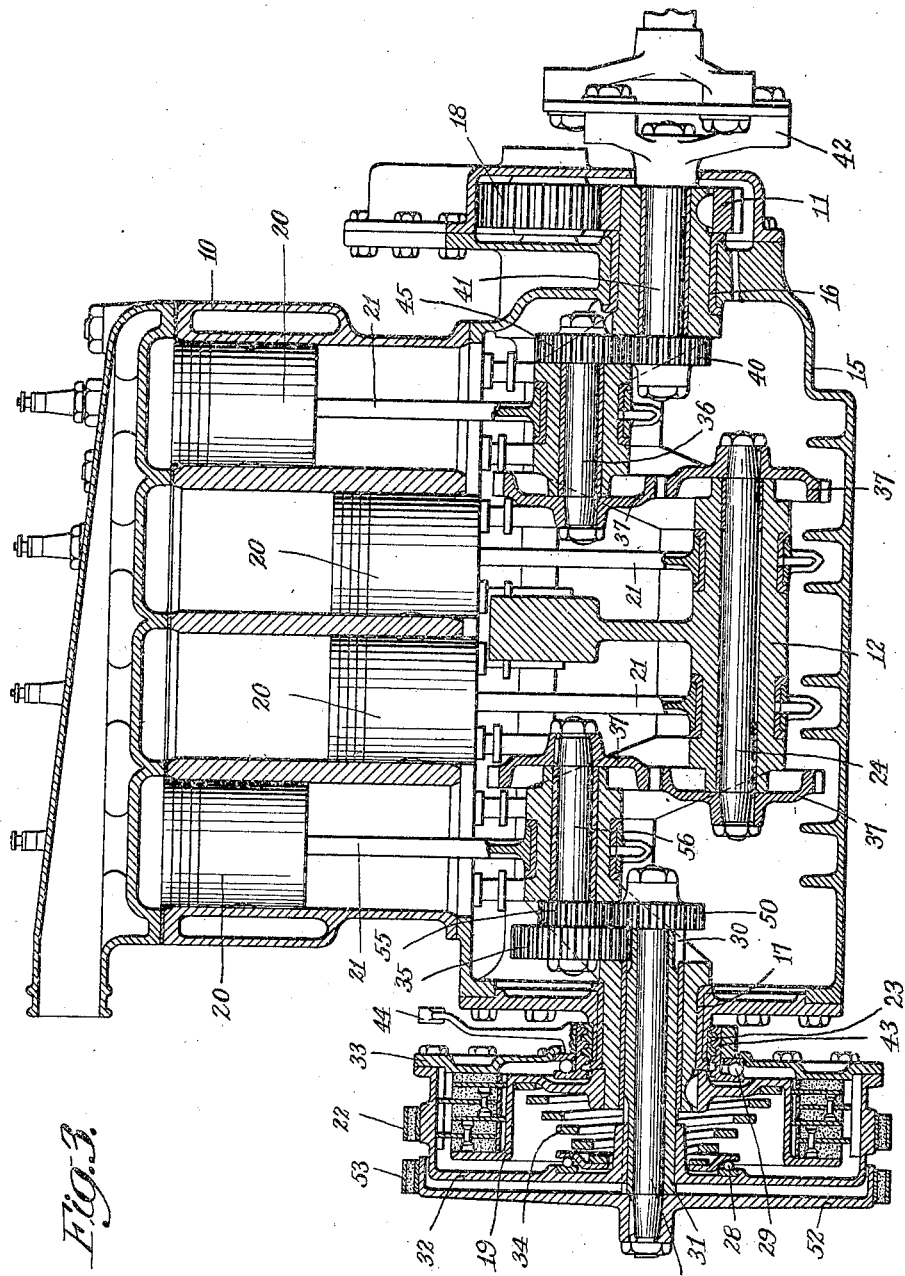

1,441,521

UNITED STATES PATENT OFFICE.

ALDEN E. OSBORN, OF NEW YORK, N. Y.

CRANK-SHAFT TRANSMISSION GEAR.

Application filed January 21, 1921. Serial No. 438,986.

*To all whom it may concern:*

Be it known that I, ALDEN E. OSBORN, a citizen of the United States of America, and a resident of New York, county of the Bronx and State of New York, have invented certain new and useful Improvements in a Crank-Shaft Transmission Gear, of which the following is a specification.

This invention relates particularly to a method of combining the transmission or speed change gear of motor vehicles with the crank shaft of the propelling motor or engine thereof in such a way that the power may be taken at different speeds and in different directions directly from the engine to the axle or wheels without the usual intermediate clutch and gear box. By this arrangement of a combined transmission gear and crank shaft I obtain the advantage of lighter weight, (due to the fact that the parts all revolve with the shaft and less flywheel weight is required), of a neater and simpler appearance, of positive oiling from the engine oiling system, of reduced noise, because of the gears being within the engine crank case, and of a more compact and easier to install power plant. While I have illustrated my invention in the accompanying drawings as applied to the crank shafts of internal combustion engines such as are used for the propulsion of motor vehicles it should be clearly understood that it is not limited in its use to that particular kind of engine or to engines that are to be used for the operation of motor vehicles alone but may be used with other kinds of engines or motors and for the operation of other devices. It should also be clearly understood that my invention is not limited in its application to use with single and four throw crank shafts such as I have, for the purposes of disclosure shown in the drawings, but that the device may readily be modified so that it can be used with other types of crank shafts. Various other modifications may be made without departure from the true spirit and scope of the invention as defined in the appended claims.

In the accompanying drawings:

Figure 1 represents a sectional elevation of a single cylinder engine having my transmission mechanism combined with a one piece single throw crank shaft.

Figure 2 represents a partial sectional elevation of a single cylinder engine having a modification of the mechanism shown in Figure 1 combined with a single throw built up crank shaft such as is customarily used in motor cycle engines, and Figure 3 represents a sectional elevation of a four cylinder engine having a further modification of my mechanism combined with a four cylinder two bearing crank shaft.

In Figure 1 and 2 I have illustrated forms of my device adapted to be used with the V twin cylinder and radial cylinder engine as well as the single cylinder type shown. Referring particularly to Figure 1, 10 indicates the engine cylinder, 15 indicates the crank case, 20 the piston and 21 the connecting rod, all of which parts may be of the customary design. The crank case 15 carries the bearings 16 and 17 in which the crank shaft 12 is mounted and is also shown as arranged to contain the two flywheels 13 and 14, attached to the crank shaft, as is usual in an engine of the type illustrated. The crank shaft 12 is of somewhat different design than the ordinary shaft in that it is, not only, provided with hollow bearings and crank pin portions, but the webs are so formed that they provide sockets or openings in which the gears of my transmission mechanism are arranged. The shaft is fitted with a gear 11 which meshes with the gear 18 of the valve actuating mechanism and with a disc 19 that forms a member of the friction clutch and may, if it is desired to eliminate the flywheels from the interior of the crank case, be made heavy enough to serve as the engine flywheel. The transmission or speed change gear system comprises a train of four gears—one of which, the driven gear 40, is mounted on the driven shaft 41, another of which 45 meshes with this gear 40 and is mounted on the intermediate shaft 36 that is carried in a bearing in the crank pin, a third gear 35 of which is also mounted on this intermediate shaft while the fourth gear 30, which meshes with this third gear is carried by a shaft 31 that passes thru a bearing in the other end of the crank shaft 12 from the shaft 41 and has its outer end attached to the drum 32 that, with the cover 33, encases the aforementioned clutch disc 19. This drum 32, together with the shaft 31 and gear 30, is arranged to slide longitudinally and is pressed outward, by the spring 34 and three equally spaced pins (one of which is shown below the shaft 31) acting against the thrust bearing 28 so that the friction surface on the drum cover 33 is normally held in contact with the face of the disc 19 thus causing the shaft 31 to turn with the crank shaft 12 and locking the gears 30, 35, 40 and 45 and shafts 36 and 41 from turning in relation thereto.

This gives the generally used direct drive to the parts which are driven by the engine and connected to the shaft 41 thru the medium of the sprocket 42. In order to slide the drum 32, and parts connected therewith, so as to disengage the friction surfaces on the disc 19 and cover 33 so that the transmission gear system may revolve and the free engine or geared speed obtained I have provided the usual arrangement of internally threaded collar 43 which can be turned, by the lever 44, about the threaded hub 23 on the engine casing and thus by its rotation draw the movable clutch parts toward the engine. As the parts, when the clutch surfaces are disengaged, would, with this arrangement, be under considerable thrust pressure I have provided a ball thrust bearing 28 to take the thrust of the spring 34 and a ball thrust bearing 29 to take the thrust of the collar 43. The threads on the hub 23 and collar 43 are of quick pitch so as to give the collar a considerable longitudinal movement with a small angular motion of the lever 44. Other types of clutch mechanism may, of course, be employed but I prefer that just described because of its simplicity and compactness. In order to obtain the rotation of the driven shaft 41 thru the action of the gears 30, 35, 40 and 45 the drum 32 is restrained from rotation (a brake band 22 being shown as provided for that purpose) thus holding the gear 30 from turning and, as the gears 35 and 45 turn about it by the rotation of the crank pin, causing these gears to turn on their axis and transmit motion to the driven gear 40 and turn the driven shaft at a different speed from the crank shaft depending on the sizes of the gears. Thus if the gear 30 is, as shown, smaller than the gear 40 the shaft 41 would revolve in the same direction as the crank shaft but at a lower speed while if the gear 30 is larger the shaft would revolve in a reverse direction and also at a lower speed.

In the modification of this mechanism shown in Figure 2 I have used practically the same mechanism as in Figure 1 just described excepting that a built up crank shaft is employed comprising a tapered ended crank pin 25 fitted into sockets in the flywheels 13 and 14 and held therein by the usual nuts 38 and two flanged shaft ends 26 and 27 bolted to the flywheels and carried in the crank case bearings 16 and 17. In this figure I have not shown the clutch for the direct drive or the brake mechanism for holding the shaft 31 as these parts can be arranged in the same way as in Figures 1 and 3 if desired. Similar figures of reference indicate similar parts to those shown in Figure 1 and described in connection therewith.

In Figure 3 a still further modification of my mechanism is shown in that it is arranged for use with a multiple throw crank shaft and is also arranged to give an additional speed either forward or backward depending on the size of the gears used as before explained. In this figure the crank shaft 12, as the engine is shown as of the four cylinder type, has four crank pins on which the connecting rods 21 have their bearing and is made with suitable sockets or openings for the transmission gears and with hollow pins and bearing portions as is the case with the shaft shown in Figure 1. The transmission gear system shown in this Figure 3 comprises ten gears in all four of which gears (indicated by reference Figure 37) are made interchangeable and serve simply to connect the intermediate shaft 56 with the intermediate shaft 36, which they do with the aid of the intermediate shaft 24, so that the shaft 36 practically forms a continuation of the shaft 56 as far as its function in transmitting the power is concerned. The end of the shaft 36 is, as in Figures 1 and 2, fitted with a gear 45 which meshes with the driven gear 40 that is mounted on the driven shaft 41 that passes thru the crank shaft and is connected to the mechanism to be driven by the engine by, in this case, the universal joint member 42 that is shown in place of the sprocket of the same reference number shown in the other figures. The opposite end of the crank shaft 12 to that in which the shaft 41 is mounted contains the bearing for the sleeve 31 which sleeve carries the gear 30 that is meshed with the gear 35 on the intermediate shaft 56 all of which parts have the same function as the corresponding parts of Figures 1 and 2. The sleeve 31, however, forms a bearing for the shaft 51 which shaft is provided at its inner end with a gear 50, which meshes with a gear 55 also on the intermediate shaft 56, and with a brake drum 52 at its outer end. The sleeve 31 also carries the drum 32, arranged in this case so that it can slide longitudinally thereon, which drum serves as an enclosing casing for the friction clutch and is provided with a cover 33 that presses against the clutch discs when the spring 34 is allowed to expand and holds the drum 32, sleeve 31 and gear system from turning in relation to the crank shaft 12 giving the direct drive as in the previously described types of my device. In order to disengage the clutch I have arranged a coarse threaded collar 43, lever 44, and threaded hub 23 and the anti-friction bearings 28 and 29 as in the other types. It will be noticed that the clutch spring 34, which is of the spiral-helix type for the sake of compactness, bears directly against the driving disc or drum 19 attached to the crank shaft 12 instead of being within the crank shaft and also that multiple discs or friction surfaces are used instead of the single surface of Figure 1. This type of clutch can be used with Figures 1 and 2 or the construction used in Figure 1 employed in connection with the mechanism of this figure if desired.

In order to restrain the rotation of the drum 32 I have provided a suitable brake 22 and I prefer that, when this brake is in action and the drum 32, sleeve 31 and gear 30 prevented from turning, the ratio of the gearing be such that the driven shaft 41 and parts connected thereto would be turned in the same direction as the crank shaft but at a lower speed which would be the case with the gears shown. I also prefer that, when the brake drum 52 be restrained from rotation, which can be accomplished by the brake band 53, the gear ratio is such that the driven shaft 41 would be turned in a backward direction which occurs when the gear 50 on the shaft 51 is larger than the gear 40 on the shaft 41 as shown. Should it be desired to get a lower speed to the driven shaft 41 than it is given by the gears 30 and 35 instead of the reverse it is obviously possible to do so by making the gear 50 on the shaft 51 smaller than the gear 40 but not as small as the gear 30 and enlarging the gear 55 to correspond. Such a change in the ratio of the gearing would be desirable when my device is used in connection with a motorcycle engine as three speeds ahead would then be preferable to two speeds and a reverse as provided in the mechanism shown. It is obvious to anyone skilled in the art that an additional speed may also be obtained with the mechanism illustrated in Figure 3 by adding another sleeve between the sleeve 31 and the shaft 51, another brake drum and band between the drum 32 and drum 52 and another set of gears between the gears 30 and 35 and the gears 50 and 55 these additional gears having a different ratio from either of the other sets. Another obvious modification, which is possible because of the fact that the sole function of the friction clutch is to lock the parts together to cause them to turn as a unit for the direct drive, is that this clutch can be placed at the opposite end of the crank shaft from the position in which it is shown in the drawings so as to connect the shaft 41 and crank shaft 12 directly together. In this case the end of the crank shaft 12 would be extended from the casing 15 and the clutch elements mounted on it between the casing and the universal joint or sprocket 42 so as to directly act on the shaft 41 independently of the gear system which would be controlled for the lower speed or speeds or the reverse by brake drums at the opposite end of the crank shaft exactly as described above. I prefer, however, the arrangement of the mechanism shown in the drawings for the reason that it is more compact and places all the levers for controlling the speed change mechanism at one end of the engine.

Having thus described my invention, I claim as new and desire to secure by Letters Patent—

1. In an engine the combination of a crank shaft, a driven element concentric with the axis of rotation of said crank shaft, a restrainable element also concentric with the axis of rotation of said crank shaft, a connecting element passing thru the crank pin of said crank shaft, a curved crank web connection between the crank pin bearing portion of the crank shaft and the main bearing portion, a gear on the restrainable element and within the crank web connection to the adjacent main bearing portion of said crank shaft, a gear on the connecting element and outside the connection of said crank web portion to the crank pin of said crank shaft said gears on substantially opposite sides of said crank web, intermeshing together thru the said curving of the web between its said connection to the main bearing portion of the shaft and to the crank pin portion, and means for transmitting motion between the connecting element and the driven element.

2. In an engine the combination of a crank shaft, a driven element concentric with the axis of rotation of said crank shaft, a restrainable element also concentric with the axis of rotation of said crank shaft, a connecting element passing thru the crank pin of said crank shaft, curved crank web connections between the said crank pin bearing portions of the crank shaft and the main bearing portions, means for transmitting motion between said restrainable element and said connecting element, a gear on the driven element and within one of the crank web connections of a main bearing portion of said crank shaft, a gear on the connecting element and outside the said connection of said crank web portion to the crank pin of said crank shaft, said gears on substantially opposite sides of said crank web intermeshing together thru the said curving of the web between its said connection to the main bearing portion of the shaft and to the crank pin portion.

3. In an engine the combination of a crank shaft, the driven element concentric with the axis of rotation of said crank shaft, a restrainable element also concentric with the axis rotation of said crank shaft, a connecting element passing thru the crank pin of said crank shaft, curved crank web connections between the crank pin bearing portions of the crank shaft and the main bearing portions, a gear on the restrainable element and within one of the crank web connections to the adjacent main bearing portion of said crank shaft, a gear on the connecting element and outside the connection of said crank web portion to the crank pin of said crank shaft, said gears on substantially opposite sides of said crank web intermeshing together thru the curving of the said web between its said connection of the main bearing portion of the shaft and to the crank pin portion, a gear on the driven element and within the connection of another crank web to another main bearing portion of said crank shaft, a gear on the connecting element and outside the connection of the latter said web portion to the crank pin of said shaft, said latter named gears on substantially opposite sides of the latter named crank web also intermeshing together thru the said curving of the web between its said connection to the main bearing portion of the shaft and to the crank pin portion.

4. In an engine the combination of a crank shaft, a connecting rod having a bearing about the crank pin thereof, a driven element concentric with the axis of rotation of said crank shaft, a restrainable element also concentric with the axis of rotation of said crank shaft, a connecting element passing thru the connecting rod bearing, bearing for transmitting motion between the said restrainable element and said connecting element on one side of the said connecting rod bearing, and gearing for transmitting motion between said connecting element and said driven element on the other side of the said connecting rod bearing, and a friction clutch acting between the crank shaft and the restrainable element for preventing the rotation of said elements and said gearing in relation to said crank shaft when desired.

5. In an engine the combination of a crank shaft, a connecting rod having a bearing about the crank pin thereof, a driven element concentric with the axis of rotation of said crank shaft, a restrainable element also concentric with the axis of rotation of said crank shaft, a connecting element passing thru the said connecting rod bearing, gearing for transmitting motion between said restrainable element and the connecting element on one side of the said connecting rod bearing, and gearing for transmitting motion between said connecting element and said driven element on the other side of the said connecting rod bearing, a friction clutch adjacent to the restrainable element for preventing at will the rotation of said elements and said gearing in relation to said crank shaft, and a friction brake for preventing at will the rotation of the restrainable element to bring said gearing into action and drive the driven element at a different speed from the said crank shaft.

6. In an engine the combination of a crank shaft, a driven element adjacent to one end thereof and rotatable in relation thereto, means, passing thru said crank shaft, for transmitting motion to said driven element, and controllable means, adjacent to the other end of the said crank shaft from the said driven element and having connection with said driven element thru said means for transmitting motion thereto, for preventing the rotation of said driven element in relation to said crank shaft.

7. In an engine the combination of a crank shaft, a driven element adjacent to one end thereof and rotatable in relation thereto, means passing thru said crank shaft, for transmitting motion to said driven element, controllable means, adjacent to the other end of the said crank shaft from the said driven element and having connection with said driven element thru said means for transmitting motion thereto, for preventing the rotation of said driven element in relation to said crank shaft, and controllable means adjacent to the first mentioned controllable means for giving said driven element a different speed of rotation from the said crank shaft thru the action of said means for transmitting motion thereto.

8. In an engine the combination of a crank shaft, a connecting rod having a bearing about the crank pin thereof, a driven element concentric with the axis of rotation of said crank shaft, a restrainable element also concentric with the axis of rotation of said crank shaft, a connecting element passing thru the said connecting rod bearing, a second restrainable element concentric with and passing thru the first named restrainable element, gearing on one side of the said connecting rod bearing for transmitting motion between each of said restrainable elements and said connecting element, and gearing on the other side of the said connecting rod bearing for transmitting motion between said connecting element and said driven element.

9. In an engine the combination of a crank shaft, a connecting rod having a bearing about the crank pin thereof, a driven element concentric with the axis of rotation of said crank shaft, a restrainable element also concentric with the axis of rotation of said crank shaft, a connecting element passing thru the said connecting rod bearing, a second restrainable element concentric with and passing thru the first restrainable element, gearing on one side of the said connecting rod bearing for separately transmitting motion at two different speed ratios between each of said restrainable elements and said connecting element, and gearing on the other side of the said connecting rod bearing for transmitting motion between said connecting element and said driven element, and controllable means for preventing the rotation of one or the other said restrainable element whereby to give the driven element two different motions in relation to the crank shaft thru the action of said gearing and said connecting element depending on which of the said restrainable element is held from rotation.

10. In an engine the combination of a crank shaft, a connecting rod having a bearing about the crank pin thereof, a driven element concentric with the axis of rotation of said crank shaft, a connecting element passing thru the said connecting rod bearing, a restrainable element also concentric with the axis of rotation of said crank shaft, a second restrainable element concentric with and passing thru the first named restrainable element, gearing on one side of the said connecting rod bearing for separately transmitting motion at two different speed ratios between each of said restrainable elements and said connecting element, and gearing on the other side of the said connecting rod bearing for transmitting motion between said connecting element and said driven element, controllable means for preventing the rotation of one or the other said restrainable element whereby to give said driven element two different motions in relation to the crank shaft thru the action of said gearing and said connecting element depending on which of the said restrainable elements is held from rotation, and controllable means for preventing the rotation of said elements and said gearing in relation to said crank shaft.

11. In an engine the combination of a crank shaft, a connecting rod having a bearing about the crank pin thereof, a driven element on one side of the said connecting rod bearing and concentric with the axis of rotation of said crank shaft, restrainable elements on the other side of the said connecting rod bearing and also concentric with the axis of rotation of the said crank shaft, means for transmitting motion between said restrainable elements and said driven element embodying gearing of different speed ratios having connection to each of said restrainable elements whereby to positively give the driven element different motions in relation to said crank shaft depending on which of said restrainable elements is held from rotation, controllable means for preventing the rotation of said restrainable elements, and controllable means for preventing the rotation of said gearing and said elements in relation to said crank shaft.

12. In an engine the combination of a crank shaft, a connecting rod having a bearing about the crank pin thereof, a driven element concentric with the axis of rotation of said crank shaft and passing thru one of the supporting bearings thereof, a connecting element passing thru the connecting rod bearing, means for transmitting motion between said connecting element and said driven element, another supporting bearing for said crank shaft, restrainable elements passing thru the latter named bearing, and separate means for transmitting motion between each of said restrainable elements and said connecting element.

13. In an engine the combination of a crank shaft, a connecting rod having a bearing about the crank pin thereof, a driven element concentric with the axis of rotation of said crank shaft and passing thru one of the supporting bearings thereof, a connecting element passing thru the connecting rod bearing, means for transmitting motion between said connecting element and said driven element, another supporting bearing for said crank shaft, a restrainable element passing thru the latter named bearing, means for transmitting motion between said restrainable element and the connecting element, a second restrainable element within the first mentioned restrainable element and also passing thru the latter named supporting bearing, and separate means for transmitting motion between each of said restrainable elements and said connecting element.

14. In an engine the combination of a crank shaft having two crank pins in different angular relations, connecting rods having a bearing about each of said crank pins, a driven element concentric with the axis of rotation of said crank shaft, a restrainable element also concentric with the axis of rotation of said crank shaft, connecting element passing thru each of the said connecting rod bearings, means for transmitting motion between said restrainable element and one of the said connecting elements, means for transmitting motion between this connecting element and the connecting element passing thru the other connecting rod bearing, and means for transmitting motion between this latter named element and the driven element.

15. In an engine the combination of a crank shaft having two crank pins in different angular relations, connecting rods having a bearing about each of said crank pins, a driven element concentric with the axis of rotation of said shaft and rotatable in relation thereto, a restrainable element also concentric with the axis of rotation of said crank shaft and also rotatable in relation thereto, connecting elements passing thru each of the said connecting rod bearings, intermeshing gears on the restrainable element and on the adjacent connecting element for transmitting motion between them, intermeshing gears on this connecting element and on the connecting element passing thru the other crank pin for transmitting motion between the two connecting elements, and means for transmitting motion between this latter named element and the driven element, and controllable means for preventing the rotation of the restrainable element to positively rotate said driven element at a different speed of rotation from the crank shaft thru the action of said gearing and said connecting elements.

In witness whereof, I have hereunto set my hand this 18th day of January, 1921.

ALDEN E. OSBORN.